United States Patent
Prieditis

(12) 
(10) Patent No.: US 10,142,403 B1
(45) Date of Patent: Nov. 27, 2018

(54) METHOD AND APPARATUS FOR FACILITATING PARALLEL DISTRIBUTED COMPUTING

(71) Applicant: Armand Prieditis, Arcata, CA (US)

(72) Inventor: Armand Prieditis, Arcata, CA (US)

(*) Notice: Subject to any disclaimer, the term of this patent is extended or adjusted under 35 U.S.C. 154(b) by 273 days.

(21) Appl. No.: 15/089,359

(22) Filed: Apr. 1, 2016

(51) Int. Cl.
*G06F 15/16* (2006.01)
*H04L 29/08* (2006.01)
*H04L 29/06* (2006.01)

(52) U.S. Cl.
CPC ............ *H04L 67/10* (2013.01); *H04L 67/142* (2013.01); *H04L 67/42* (2013.01)

(58) Field of Classification Search
USPC .......................................... 709/202, 223, 245
See application file for complete search history.

*Primary Examiner* — Lan Dai T Truong

(57) ABSTRACT

Embodiments of the present invention facilitate parallel distributed computing. During operation, embodiments of the present invention receive from a requesting node an operator $o_1$ and unevaluated expressions representing arguments for that operator. Next, embodiments of the invention evaluate the arguments and then determine another unevaluated expression based on that operator and the evaluated arguments. Subsequently, embodiments of the invention send the another evaluated expression to other nodes for evaluation and receive the resulting evaluated expression, which is then returned to the requesting node.

15 Claims, 3 Drawing Sheets

METHOD AND APPARATUS FOR FACILITATING PARALLEL DISTRIBUTED COMPUTING

This application hereby claims priority under 35 U.S.C. ⹁ 119 to U.S. Provisional Patent Application No. 62/142,462 filed on 2 Apr. 2015, entitled "Method and Apparatus for Facilitating Parallel Distributed Computing," by inventor Armand Erik Prieditis. The instant application hereby incorporates by reference this provisional application.

BACKGROUND

Field of the Invention

The present invention relates generally to parallel distributed computing. More specifically, the present invention relates to a plurality of servers, which provide a mechanism through which functional expressions can be distributed and evaluated in parallel and among the plurality of servers.

Related Art

Parallel distributed computing systems can be divided into two categories: data parallelism and computational parallelism. Data-parallelism involves splitting the data into two or more pieces, processing each of the data splits on different machines in parallel, and then combining the results from each machine to produce the desired result. Typically, the data is big enough so that the parallel processing results in a large speedup. In contrast, computational parallelism usually does not involve big data, but the computations themselves are split.

As an example of data parallelism, consider the problem of computing the sum of 100 million rows of data: split the original data 100 parts, compute the sum of each of the 100 parts in parallel, and then combine the results together to form the total sum. Since each of the 100 parts of data comprises 1 million rows, the process will be roughly 100 times faster than processing all of the rows together. Business interest in data-parallel systems such as Hadoop and Spark has exploded in the last decade because such systems offered faster processing power on big data, which appears to be getting bigger and bigger each year. An example of a data-parallel system is SETI@home, which splits data from radio telescopes into multiple parts and parcels those splits to home computers that are part of the SETI@home network, and then these home computers search for signs of extra-terrestrial intelligence in parallel on their respective split of the data.

As an example of computational parallelism, consider the problem of calculating the future potential of a chess move. This process is extremely computationally intensive because it involves building an exponentially increasing search tree of moves, responses to moves, responses to responses to moves, and so on. In such situations, data parallelism offers no speedup because there is no actual big data to split into multiple parts.

Computational parallelism can occur at the bit level, instruction level, or the task level. As with data parallelism, the original problem is decomposed into multiple smaller computations and then the results of those smaller computations are combined.

Computational parallelism has been most closely associated with high-performance computation and multi-core processors and can be classified relative to the level at which the hardware supports parallelism. For example, multi-core and multi-processor computers have multiple processing elements within a single machine. In contrast, clusters, Massively Parallel Processors (MPPs), and grids use multiple computers to work on the same task. Specialized parallel computer architectures, such as Graphics Processing Units (GPUs) can be used alongside traditional processors for accelerating specific tasks such as the display of graphics for games. Typically, grid computing uses the Internet as the communication medium and is usually applied to what are called embarrassingly parallel problems—those for which there is little or no effort required to separate the problem into a number of parallel tasks—because of the Internet's low bandwidth and high latency. For example, this is the case when there is no communication required between those parallel tasks. The application Folding@home is an example of embarrassingly parallel grid computing: multiple simulations for protein folding are run on home machines and then the results are combined.

Parallel distributed computing is important for several reasons. First, the real world is parallel and simulating it can require massive parallelism to produce results within a short time-frame (e.g., for weather forecasts). Second, it can be used to shorten time to produce any results, not just simulation results, with machines that can be built from inexpensive commodity components. Third, it can be used to solve larger and more complex problems. For example, some problems such as the Grand Challenge Problems are so large and complex that they cannot be solved on a single computer. Fourth, it can be used to provide concurrency for those situations that require fast response to multiple entities making requests (e.g., chat rooms). Fifth, it can take advantage of non-local resources (e.g. on a wide-area network or the Internet) when local resources are scarce. For example, SETI@home has over 1.3 million users with 3.4 million computers in nearly every country of the world. Finally, it can better leverage underlying parallel hardware for certain applications. For example, gaming computers often use GPUs to accelerate the computation of graphics so that realistic-appearing action can be shown in real time.

Data parallelism uses general-purpose hardware running special-purpose software. In contrast, computational parallelism tends to use special-purpose hardware running special-purpose software. In the case of distributed applications such as Folding@home, a middle layer of software simulates special-purpose hardware.

One problem with current parallel-distributed computing systems is that the primary architecture is either data parallel or computation parallel, but not both. Data parallel systems can, of course, make use computationally parallel systems, but the primary fixed choice is data parallelism over computational parallelism. This fixed choice can limit the types of applications a user might wish to run by forcing the user to choose data parallelism over computational parallelism. Such a choice is arbitrarily forced on the user as an artifact of a poor design.

Another problem with current parallel-distributed systems is that their computations are not recursively distributed in parallel. That is, they are distribute-once systems. For example, SETI@home and Folding@home distribute their processing only once to multiple machines, which do not further and recursively distribute their processing to other machines. Such recursion is a fundamental part of any modern programming language and can be used to implement powerful and useful recursive routines. For example, merge-sort, which recursively splits data into two parts, sorts both parts, and then merges the results (the recursion terminates when a part contains only a single data element), is one such well-known recursive routine. Modern data parallel systems such as Hadoop and Spark are unable to implement even simple multiple recursive routines such as merge-sort because they are distribute-once systems.

Hence, what is needed is a method and an apparatus that facilitates recursive parallel distributed computing without suffering from the above-described problems.

SUMMARY

One embodiment of the present invention solves the problem of parallel-distributed computing by paralleling both the data and the computations through recursive parallel computations. As a result, these embodiments do not require a distribute-once architecture and hence facilitate not only solving a wider variety of problems, but solving them faster through more opportunities for parallelism through recursion.

The advantages of Embodiments of the present invention relative to data parallel and computationally parallel systems are as follows. Data parallel systems such as Hadoop, Spark, SETI@home, and Folding@home run a divide-once-and-combine method on general-purpose machines. For example, SETI@home divides the processing among multiple machines only once and then combines the results. Because these methods divide their processing only once, they cannot implement even the simplest recursive routine (e.g., merge-sort). At the other end of the spectrum, computationally parallel systems run on specialized hardware such as GPUs, Vector Processors, Grids, and MPPs, but require specialized compilers and writing explicitly parallel code, thus making development costs soar.

In contrast, embodiments of the present invention are both data parallel and computationally parallel. However, unlike computationally parallel methods, embodiments of the present invention execute on general-purpose hardware, does not require specialized compilers, and are implicitly parallel (i.e., does not require writing explicitly parallel code). Moreover, embodiments of the present invention can automatically and recursively distribute its computations to any number of computing devices, none of which have to be specified in advance or dedicated for the sole use of embodiments of the present invention. Embodiments of the present invention will even run on mobile devices.

Embodiments of the present invention can harness under-utilized machines without having to make awkward arrangements with the users of those machines. Embodiments of the present invention deploy instantly: no "spinning up" instances; no specifying a confusing and dizzying array of run-time options such as the instance size, the number of CPUs, the amount of memory, the amount of instance storage, scheduling options, optimization types, and network performance. Instead, embodiments of the present invention free the user from the gory details of how to run it on parallel hardware so that you can focus on the creative aspects of your task. Embodiments of the present invention can be launched from a browser and can run on enterprise machines or in the cloud or both. Embodiments of the present invention can also run through Application Program Interfaces (APIs), so that the user can incorporate these embodiments into the user processing pipelines.

During operation, embodiments of the present invention can perform the following operations:

Receive at a receiving node from a requesting node an operator $o_1$ and unevaluated expressions $e_1, e_2, \ldots, e_k$, wherein k>0.

Send to a node $a_1$ unevaluated expression $e_1$, send to a node $a_2$ unevaluated expression $e_2, \ldots$, and send to a node $a_k$ unevaluated expression $e_k$. These sending operations can be executed in parallel and the nodes can be on different machines from the machine that received the request the requesting node. The nodes $a_1, a_2, \ldots,$ and $a_k$ can be determined by the receiving node or by request from the receiving node to some other computing device to obtain a list of nodes that are least busy or are most likely to evaluate the unevaluated expressions $e_1, e_2, \ldots, e_k$ quickly or expediently or at the least cost. This determination of nodes can be based on historical data relating to time or cost.

Receive at the receiving node from node $a_1$ evaluated expression $p_1$ in response to sending node $a_1$ unevaluated expression $e_1$, receive from node $a_2$ a evaluated expression $p_2$ in response to sending node $a_2$ unevaluated expression $e_2, \ldots,$ and receive from node $a_k$ evaluated expression $p_k$ in response to sending node $a_k$ unevaluated expression $u_k$.

Determine an operator $o_2$ and unevaluated expressions $c_1, c_2, \ldots, c_n$ based on the operator $o_1$ and evaluated expressions $p_1, p_2, \ldots, p_k$, wherein n>2.

Send to a node $f_1$ unevaluated expression $c_1$, send to a node $f_2$ unevaluated expression $c_2, \ldots,$ and send to a node $f_n$ unevaluated expression $c_n$. The nodes $f_1, f_2, \ldots,$ and $f_n$ can be determined by the receiving node or by request to some other computing device to a list of nodes that are least busy or are most likely to evaluate the unevaluated expressions $c_1, c_2, \ldots, c_n$ quickly or expediently or at the least cost. This determination of nodes can be based on historical data relating to time or cost.

Receive at the receiving node from node $f_1$ evaluated expression $g_1$ in response to sending node $f_1$ unevaluated expression $c_1$, receive from node $f_2$ a evaluated expression $g_2$ in response to sending node $f_2$ unevaluated expression $c_2, \ldots,$ and receive from node $f_n$ evaluated expression $g_n$ in response to sending node $f_n$ unevaluated expression $c_n$.

Determine an evaluated expression r based on the operator $o_2$ and evaluated expressions $g_1, g_2,$ and $\ldots g_n$.

Send to the requesting node evaluated expression r, thus producing a result that indicates a response to receiving from the requesting node an operator $o_1$ and expressions $e_1, e_2, \ldots, e_k$.

A node can be virtual (software) or physical (hardware). For example, a node can be a server, a personal computer, a laptop, a mobile device, a notepad, or any software emulating such physical devices.

Nodes can send requests and receive responses over a network, which comprises two or more computers that are linked together. The linkage can be wired, wireless, or virtual. The linkage can comprise multiple hops between the two or more computers. For example, the linkage between two nodes can be the internet. Although the internet comprises millions of computers, not all of these computers are required to be nodes operating as embodiments of the present invention. That is, some of the millions of computers can serve merely as communication links between nodes operating as embodiments of the present invention while others can operate as embodiments of the present invention. The linkage can also be private networks at an enterprise or any other organization.

The nodes $a_1, a_2, \ldots, a_k$ and the nodes $f_1, f_2, \ldots, f_f$ can be determined based on information received by the receiving node from a server or centralized machine, information hardcoded into receiving node, and information received by the receiving node from other nodes. Moreover, the nodes $a_1, a_2, \ldots, a_k$ and $f_1, f_2, \ldots, f_n$ can be determined based on past performance of these nodes on similar computations. For example, these nodes can be selected based on historical times to produce responses to requests similar to the respective requests associated with these nodes. The nodes can also be chosen at random or in a round-robin fashion from a list of nodes, which itself can be determined as described above.

To facilitate fault tolerance, multiple different sets of nodes $a_1, a_2, \ldots a_n$ and $f_1, f_2, \ldots f_n$ can be selected and multiple different sets of the same requests can then be sent to these nodes. To facilitate a competitive marketplace multiple different sets of nodes $a_1, a_2, \ldots a_n$ and $f_1, f_2, \ldots f_n$ can be selected for the same respective request as in a contest: of the nodes that are given the same request, the first node to return a result can be rewarded monetarily. For example, the first node can send nodes $f_{1a}$ and $f_{1b}$ the same request $s_1$. If the first node receives a response to request $s_1$ from node $f_{1a}$ first, then node $f_{1a}$ wins monetary reward. Thus, embodiments of this invention can facilitate a competitive marketplace for nodes that are competing to return the fastest response to a request.

The monetary reward for the winning node can be based on the complexity of returning a response to request. For example, the node can reward a winning node by paying out a different fixed rate for each of the following operations involved in the request: multiplication, division, addition, and subtraction. Any requesting node can calculate how many such operations are required to return a result and thus set the price automatically based on a differential rate for these operations. Alternatively, the node can entertain bids for the price and award the request to the node with the lowest bid. The bids can also be determined based on both price and speed of returning a result.

In some embodiments of the present invention, the unevaluated expression can be a mathematical expression, a query to retrieve data, or a command to store data. More specifically, an operator can be any mathematical operation such as +, −, *, and / and the expressions are its arguments, which can themselves be mathematical operations and arguments. Thus, these unevaluated expressions can be recursive, with any number of recursive levels.

An evaluated expression corresponds to an expression that has no function or arguments. That is, a evaluated expression can be a real value, an integer, a Boolean, a character, a character string, a matrix, a row vector, a column vector—any mathematical construct or structure that does not represent an operator and its arguments. An evaluated expression can be viewed as a data structure representing a mathematical construct.

An operator can involve a constructor and evaluated expressions. For example, a matrix evaluated expression can be constructed with a matrix operator and four arguments, corresponding to the upper left, upper right, lower-left, and lower-right values, which can themselves be matrices, similarly constructed. Most modern languages have such constructor operators. For example, in LISP's read-eval-print loop, a LISP interpreter reads an expression, evaluates it, returns a data structure, which is then "printed" out. Thus, in embodiments of the present invention an evaluated expression can be viewed as a data structure that can in turn be "printed" out for human consumption. The exact description of the data structure is irrelevant for purposes of this invention-what is important is that these structures can be tested as to whether or not they are evaluated expressions.

For example, an evaluated expression might be 5.4. An unevaluated expression might be (3.1+5.4). As mentioned above, an unevalued expression can be nested arbitrarily deeply. For example (3.1+(12.6*+4.3)) is an unevaluated expression two levels deep. Similarly, matrices, row vectors, and column vectors can be recursively constructed out of real-values, integers, Booleans, characters, string—any data type such as those found in any programming language or mathematical constructs.

In some embodiments of the present invention, the evaluated expression r can be indicated indirectly through the following: through an indication of that response, through a proof of a delivery, through a promise of a delivery, through a reservation for a delivery, through a receipt of the storage of evaluated expression, or through the retrieval of data or a piece of content.

The determination of an operator $o_2$ and expressions $c_1, c_2, \ldots, c_n$ based on the operator $o_1$ and evaluated expressions $p_1, p_2, \ldots, p_k$, can be based on software already installed at the node or on software that is received at substantially the same time as receiving from a requesting node an operator $o_1$ and expressions $e_1, e_2, \ldots, e_k$.

Similarly, the determination of a evaluated expression r based on the operator $o_2$ and evaluated expressions $g_1, g_2$, and $\ldots g_n$ can be based on software already running at the node or on software that is received at substantially the same time as the request.

BRIEF DESCRIPTION OF THE FIGURES

In the figures, like reference numerals refer to the same figure elements.

DETAILED DESCRIPTION

Figure 1:
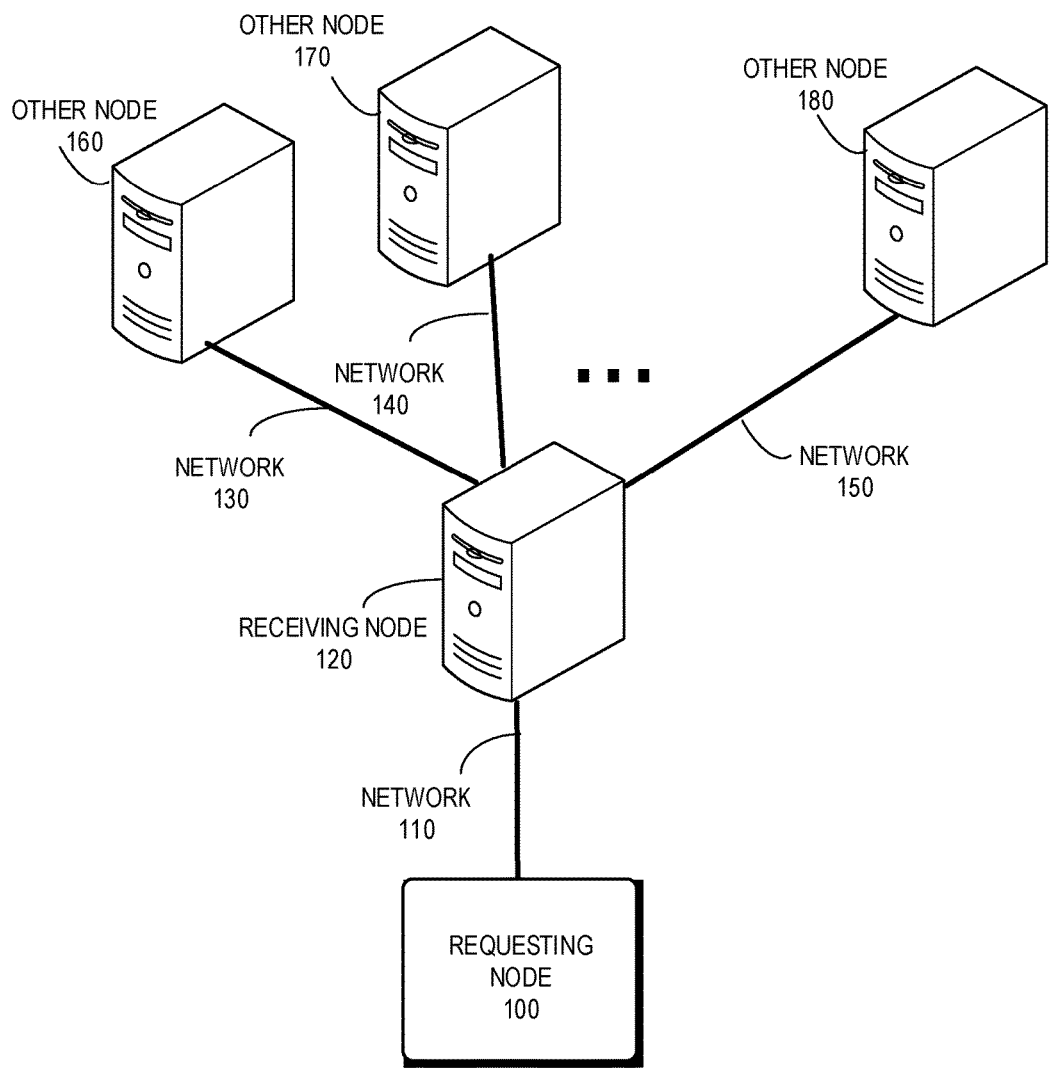
FIG. 1 illustrates the network context of for facilitating parallel distributed computing in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them Matrix Inversion As an embodiment of the invention, consider the problem of matrix inversion. Matrix inversion is important in machine learning, optimal filtering, graph theory, linear combination of quantum states in physics, computer graphics, solving linear equations, regression/least squares fit, multiple-input/multiple output technology in wireless communication, real-time simulation, state estimation, optimization, inverse model-based control, cryptography, and disturbance canceling.

The standard approaches to matrix inversion do not scale up as matrix size n increases. For example, Gauss-Jordan elimination is $O(n^3)$ time complexity, the Strassen algorithm is $O(n^{2.807})$ time complexity, the Coppersmith-Winograd (CW) algorithm is $O(n^{2.376})$ time complexity, Optimized CW-like algorithms are $O(n^{2.373})$ time complexity. This means that when a matrix is considerably larger than n=1000 (i.e. 1000×1000), modern computers cannot feasible accomplish matrix inversion. In contrast, embodiments of this invention can invert a matrix in parallel in O(n) time, which is roughly n times faster than the current best inversion algorithm.

To understand how embodiments of this invention accomplish this, consider an n×n (square) matrix that has been conformably partitioned into $$\begin{bmatrix} A & B \\ C & D \end{bmatrix}.$$

Furthermore, consider that A, B, C, and D have been similarly conformably and recursively partitioned into smaller and smaller equally sized matrices, where the smallest matrix is 2×2. Thus A, B, C, and D are each n/2× n/2 matrices. Embodiments of the present invention can leverage the following equation that defines an inversion for a square matrix:

$$\begin{bmatrix} A & B \\ C & D \end{bmatrix}^{-1} = \begin{bmatrix} (A-BD^{-1}C)^{-1} & (C-DB^{-1}A)^{-1} \\ (B-AC^{1}D)^{-1} & (D-CA^{-1}B)^{-1} \end{bmatrix}.$$

In embodiments of the present invention, this equation can be an example of determining an operator $o_2$ and expressions $c_1, c_2, \ldots, c_n$ based on the operator or and evaluated expressions $p_1, p_2, \ldots, p_k$, wherein n>2. In this case, the operator $o_1$ is inversion and the evaluated expressions correspond to A, B, C, and D. The operator $o_2$ corresponds to the matrix constructor [ ] and the expressions $c_1, c_2, c_3,$ and $c_4$ correspond to $(A-BD^{-1}C)^{-1}$, $(C-DB^{-1}A)^{-1}$, $(B-AC^{-1}D)^{-1}$, and $(D-CA^{-1}B)^{-1}$, respectively. The matrix constructor has four arguments, corresponding to the upper-left, upper-right, lower-left, and lower-right parts of the matrix, which themselves can be matrices.

More specifically, embodiments of the present invention node receive the expressions A, B, C, and D and the inversion operator. (i.e.

$$\left(i.e. \begin{bmatrix} A & B \\ C & D \end{bmatrix}^{-1}\right)$$

) from a requesting node. The expressions A, B, C, and D are then send to nodes a1, a2, a3, and a4 respectively. These nodes then evaluate the expressions A, B, C, and D recursively. When these nodes have finished their evaluation, they return evaluated expressions $p_1, p_2, p_3,$ and $p_4$ in response. These evaluated expressions correspond to constants such as real values or matrices (and possibly submatrices) containing only constants.

Next, embodiments of the present invention determine the operator $o_2$, which corresponds to the matrix constructor [ ] and the expressions $c_1, c_2, c_3,$ and $c_4$, which correspond to $(A-BD^{-1}C)^{-1}$, $(C-DB^{-1}A)^{-1}$, $(B-AC^{-1}D)^{-1}$, and $(D-CA^{-1}B)^{-1}$, based on p1, p2, p3, and p4 and the inversion operator. As described above, this determination corresponds to the equation for an inversion operation, as described in terms of simpler expressions.

Subsequently, the first node sends $(A-BD^{-1}C)^{-1}$ to node $f_1$, $(C-DB^{-1}A)^{-1}$ to node $f_2$, request $(B-AC^{-1}D)^{-1}$ to $f_3$, and $(D-CA^{-1}B)^{-1}$ to $f_4$. Nodes $f_1, f_2, f_3,$ and $f_4$ can recursively process these expressions, possibly sending subexpressions (or their equivalents) to other nodes.

Next, embodiments of the present invention received evaluated expressions $g_1, g_2, g_3$ and $g_4$ from nodes $f_1, f_2, f_3,$ and $f_4$ respectively. After this, embodiments of the present invention determine a evaluated expression r, which in this case is $$\begin{bmatrix} g_1 & g_2 \\ g_3 & g_4 \end{bmatrix}$$

and return to the requesting node.

Note this example is only a partial description of the embodiments of the invention, specifically focusing on the matrix operations. In the above example, the software can additionally implement operations such as addition, subtraction, multiplication, and inversion-all in a parallel-distributed framework. For example, $$\begin{bmatrix} A_1 & B_1 \\ C_1 & D_1 \end{bmatrix} \times \begin{bmatrix} A_2 & B_2 \\ C_2 & D_2 \end{bmatrix} = \begin{bmatrix} A_1A_2 + B_1C_2 & A_1B_2 + B_1D_2 \\ C_1A_2 + D_1C_2 & C_1B_2 + D_1D_2 \end{bmatrix}.$$

In this example, the first node can turn the request for $$\begin{bmatrix} A_1 & B_1 \\ C_1 & D_1 \end{bmatrix} \times \begin{bmatrix} A_2 & B_2 \\ C_2 & D_2 \end{bmatrix}$$

into the following four requests: $A_1A_2+B_1C_2$, $A_1B_2+B_1D_2$, $C_1A_2+D_1C_2$ and $C_1B_2+D_1D_2$, all of which can be executed in parallel on other nodes. In this way, embodiments of the present invention execute multiplication in parallel, thus embodying parallel distributed computing. The responses to each of these four requests can be combined into a matrix and then returned to the requesting node. Similar operations are possible for addition and subtraction. Similar expressions exist for row and column vectors as involved in matrix multiplication (and division, subtraction, and addition).

Embodiments of the present invention can also reference operands, which are part of a request, indirectly instead of explicitly sending the operands over the network. For example, the contents of a matrix can be indirectly referred to with a unique name instead of passing the contents to each node. That is, a node can store and access parts of a matrix instead of passing it in. Such indirect reference can speed computation by avoiding sending large structures across the network. The data associated with the matrix can, for example, be stored prior to the requests that nodes receive associated with that matrix. The matrix can be conveniently indexed where the root is indexed with a 0 and a given node i has four children (corresponding two the A, B, C, and D portions of the matrix), with indices 4i+1, 4i+2, 4i+3, and 4i+4. Other such indexing methods are possible. These indexing methods facilitate rapid retrieval of the relevant portions of the matrix. More specifically, each index location can include the type (i.e., matrix, row vector, column vector, or real) and the does not require a listing of the child indices because the calculation of 4i+1, 4i+2, 4i+3, 4i+4 is the same for every node. Other similar numbering schemes can be used. For example, indexing schemes involving 2i+1 and 2i+2 can be used for row and column vectors.

The first node can be indexed by 1 and the children of node i can be referenced by 4i−2, 4i−1, 4i, and 4i+1. Hashing schemes can also be used, where the child number does not have to be explicitly stored in the database at a node. The child number can, of course, be stored, but this requires more memory.

All nodes are running substantially the same routine, receiving requests to evaluate expressions and returning responses to those requests. Embodiments of the present invention can also follow the reverse network path to producing a response to a request. That is, if node A sends node B an expression and node B sends node C an expression, node C, when it returns a evaluated expression, routes the evaluated expression back to B, which routes it back to A. That is, the routing is what is called reverse-path routing in the networking world: a signal follows the reverse path backwards. Other return paths can be used, including a shortest path or path of least resistance or fastest path.

It is possible for a node to cache the results and re-use them for the same request. For example, in an inversion computation, there are often common subexpressions that can be re-used. If these common subexpressions and the resulting evaluated expressions can be cached, then the results can be returned faster by reusing the cached information.

A node can use any communication protocol to send requests and receive responses. For example, a node can use HTTP, TCP, UDP, ICMP, POP, FTP, IMAP, GOIP, RMI, DCOM, DDE, SOAP, BitTorrent, Sockets, and other protocols.

The software running at a node in the network can be implemented in any computer language, such as in Javascript, Java, or Python.

More generally, determining an operator $o_2$ and unevaluated expressions $c_1, c_2, \ldots, c_n$ based on the operator $o_1$ and evaluated expressions $p_1, p_2, \ldots, p_k$, wherein n>2, can be viewed as a divide-and-conquer method. For example, the unevaluated expression $$\begin{bmatrix} A & B \\ C & D \end{bmatrix}^{-1}$$

can be used to determine the operator for matrix construction and four unevaluated expression corresponding to $(A-BD^{-1}C)^{-1}$, $(C-DB^{-1}A)^{-1}$, $(B-AC^{-1}D)^{-1}$, and $(D-CA^{-1}B)^{-1}$, which the upper-left, upper-right, lower-left, and lower-right portions of the matrix to be constructed with the matrix operator. be implemented in the apply function, where the input is the inversion and the output is an expression with the matrix constructor and $(A-BD^{-1}C)^{-1}$, $(C-DB^{-1}A)^{-1}$, $(B-AC^{-1}D)^{-1}$, and $(D-CA^{-1}B)^{-1}$.

One skilled in the art will appreciate that any program can be written in the language interpreted by embodiments of the invention at the node can be run by the node to produce results. However, not all programs can be made more efficient by parallel distributed computing. For example, programs with sequential processing may not see much speedup from parallel distributed computing.

One way to implement inversion embodiments of the present invention is by automatically partitioning a matrix into four or more approximately equal pieces. If the pieces are square, then embodiments of the present invention can use the above recursive parallel routines to parallel distribute the computations as described above. For example, this automatic partitioning can be implemented as Python code shown below:

```
import numpy as np
def s(A,B,D,C,Dsize):
    #Shur complement
    return A - (np.dot(np.dot(B,inv(D,Dsize)),C))
def makevector(A,B):
    return np.concatenate((A,B),axis = 0)
def makematrix(A,B,C,D):
    #This concatenates the upper and lower halves,
which are each concatenations of the right and left
    #Alternatively, we could concatenate the left
and right halves, which are each concatenations of the
upper and lower
    upper - np.concatenate((A,B),axis=1)
    lower = np.concatenate((C,D),axis=1)
    return np.concatenate((upper,lower),axis=0)
def inv(x,size):
    if (size == 1):
        return np.array([[1/x[0,0]]])
    else:
        #This will always split so that A and D are
always guaranteed to be square
        #D is guaranteed to be the larger of the two
in an unequal split
        #The split is as close as possible to
splitting into 4 equal pieces
        #Could also split so that A is bigger, but the
results will be the same
        Asize = size/2
        #This is an integer split so that D gets the
leftover, which is greater or equal to A
        Dsize = size−Asize
        #Partition the matrix
        A = x[:Asize,:Asize]
        B = x[:Asize,Asize:]
        C = x[Asize:,:Asize]
        D = x[Asize:,Asize:]
        #These next two are done regardless of odd or
even matrix size
        tA = inv(s(A,B,D,C,Dsize),Asize)
        tD = inv(s(D,C,A,B,Asize),Dsize)
```

-continued

```
    if (size%2 == 0):
        #Test for even matrix size
        #Means that A, B, C, and D are all square
        tB = inv(s(C,D,B,A,Asize),Asize)
        tC = inv(s(B,A,C,D,Asize),Asize)
    else:
        #B and C are not square
        tB = -np.dot(np.dot(inv(A,Asize),B),tD)
        #or tB = -
np.dot(np.dot(tA,B),inv(D,Dsize))
        tC = -np.dot(np.dot(inv(D,Dsize),C),tA)
        #or tC = -
np.dot(np.dot(tD,C),inv(A,Asize))
    return makematrix(tA,tB,tC,tD)
```

Note that the uneven split of the matrix (i.e., when it is of odd size), can use split the pieces into different approximately equal halves up to four different ways. For example, if the matrix is 5×5, the split can be into any of the following matrices:

$$\begin{bmatrix}\begin{bmatrix}\bullet & \bullet & \bullet\\\bullet & \bullet & \bullet\\\bullet & \bullet & \bullet\end{bmatrix}\begin{bmatrix}\bullet & \bullet\\\bullet & \bullet\\\bullet & \bullet\end{bmatrix}\\\begin{bmatrix}\bullet & \bullet & \bullet\\\bullet & \bullet & \bullet\end{bmatrix}\begin{bmatrix}\bullet & \bullet\\\bullet & \bullet\end{bmatrix}\end{bmatrix}, \begin{bmatrix}\begin{bmatrix}\bullet & \bullet\\\bullet & \bullet\\\bullet & \bullet\end{bmatrix}\begin{bmatrix}\bullet & \bullet & \bullet\\\bullet & \bullet & \bullet\\\bullet & \bullet & \bullet\end{bmatrix}\\\begin{bmatrix}\bullet & \bullet\\\bullet & \bullet\end{bmatrix}\begin{bmatrix}\bullet & \bullet & \bullet\\\bullet & \bullet & \bullet\end{bmatrix}\end{bmatrix},$$

$$\begin{bmatrix}\begin{bmatrix}\bullet & \bullet & \bullet\\\bullet & \bullet & \bullet\end{bmatrix}\begin{bmatrix}\bullet & \bullet\\\bullet & \bullet\end{bmatrix}\\\begin{bmatrix}\bullet & \bullet & \bullet\\\bullet & \bullet & \bullet\\\bullet & \bullet & \bullet\end{bmatrix}\begin{bmatrix}\bullet & \bullet\\\bullet & \bullet\\\bullet & \bullet\end{bmatrix}\end{bmatrix}, \text{ and } \begin{bmatrix}\begin{bmatrix}\bullet & \bullet\\\bullet & \bullet\end{bmatrix}\begin{bmatrix}\bullet & \bullet & \bullet\\\bullet & \bullet & \bullet\end{bmatrix}\\\begin{bmatrix}\bullet & \bullet\\\bullet & \bullet\\\bullet & \bullet\end{bmatrix}\begin{bmatrix}\bullet & \bullet & \bullet\\\bullet & \bullet & \bullet\\\bullet & \bullet & \bullet\end{bmatrix}\end{bmatrix}.$$

These partitions will yield the same results, so it doesn't matter which particular partition is used. The above Python code uses one particular partitioning; the other partitions are merely mathematical equivalents and they are not shown in the Python code above. Here and elsewhere, it is assumed that these various partitioning equivalents can also be used but are merely not shown for brevity.

Similarly, the partitioning does not necessarily have to be in two approximately equal pieces for rows and columns—it can also be into k (k>2) approximately equal pieces. However, for some operations, the expressions become too complicated to implement.

Note also that the np.dot and subtraction operations can themselves be parallelized; these parallel versions are not shown for simplicity. For example, in die matrices below it the two matrices to be multiplied are conformably partitioned as $A_1$, $B_1$, $C_1$, $D_1$ and $A_2$, $B_2$, $C_2$, and $D_2$ then:

$$\begin{bmatrix}A_1 & B_1\\C_1 & D_1\end{bmatrix}\times\begin{bmatrix}A_2 & B_2\\C_2 & D_2\end{bmatrix}=\begin{bmatrix}A_1A_2+B_1C_2 & A_1B_2+B_1D_2\\C_1A_2+D_1C_2 & C_1B_2+D_1D_2\end{bmatrix}$$

Embodiments of the present invention can facilitate arbitrarily deep levels of recursion with mixed operations such as multiplication, division, subtraction, inversion, and addition.

Determinants

Using a similar derivation as for the inverse, det $$\left(\begin{bmatrix}A & B\\C & D\end{bmatrix}\right)$$

=det(A)det(D−CA$^{-1}$B)=det(D) det(A−BD$^{-1}$C)=det(B) det(DB$^{-1}$A−C)=det(C) det(AC$^{-1}$D−B)=det(DA−DBD$^{-1}$C)=det(AD−ACA$^{-1}$B). Each of these formulae can be used to determine the operator $o_2$ given the operator $o_1$ and the expressions. Here, operator $o_1$ is the determinant. Similar formulae can be used to determine $o_2$ if the matrix is non-square.

Regression

The task of regression to find a transformation X, that when applied to the input rows A concatenated with a 1 vector, will yield the output rows B. Algebraically, the task is to find a transformation X such that [A\1]X=B, which in long-form is $$\begin{bmatrix}\begin{pmatrix}a_{1,1} & \cdots & a_{1,n}\\\vdots & \ddots & \vdots\\a_{k,1} & \cdots & a_{k,n}\end{pmatrix}\begin{vmatrix}1\\\vdots\\1\end{vmatrix}\end{bmatrix}\begin{bmatrix}x_1\\\vdots\\x_{n+1}\end{bmatrix}=\begin{bmatrix}b_1\\\vdots\\b_k\end{bmatrix},$$

where n is the number of columns (inputs) and k is the number of rows. To find the constant in regression, A is concatenated with a column of ones and $x_{n+1}$ is added to X. The solution, X=[A\1]$^{-1}$B, is easy to express but hard to compute because the inversion A$^{-1}$ requires at least O(n$^{2.373}$) operations. When the data is wide (i.e., when n is large), inversion is difficult or impossible to solve on today's machines. It's possible to find parameters for non-linear regression by increasing the number of input variables (i.e., adding other user-specified basis functions) or by transforming the output variable.

In this situation, the inversion is actually the Moore-Penrose pseudo-inverse, which is defined as the normal inverse if[A\1] is square, [A\1]$^T$([A\1] [A\1]$^T$)$^{-1}$ when [A\1] is broad (i.e., the "right" inverse), and ([A\1]$^T$[A\1])$^{-1}$[A\1]$^T$ when [A\1] is tall (i.e., the "left" inverse). Here, the "T" operation is transpose.

Reachability and Shortest Paths in a Graph

Another embodiment of the present invention, numerous problems involve the computation of reachability between all pairs of vertices in a graph comprised of edges and vertices. A edge between vertex i and vertex j corresponds to an entry in an adjacency matrix for row i and column j equal to a 1. If there is no such edge, the entry is 0. The objective for reachability is to compute the transitive closure for all pairs of vertices. That is, there may be an indirect path between two vertices even though no direct edge exists. The function for reachability can be defined recursively in embodiments of the present invention as follows:

$$f(n)=\begin{cases}A & n=1\\A\vee[A\wedge f(n-1)] & n>1\end{cases}$$

Where the parallel-distributed recursive versions of A and V are defined in embodiments of the present invention as follows for matrices, conformably partitioned into A, B, C, D and correspondingly X, Y, W, and Z:

$$\begin{bmatrix}A & B\\C & D\end{bmatrix}\wedge\begin{bmatrix}X & Y\\W & Z\end{bmatrix}=\begin{bmatrix}(A\wedge X)\vee(B\wedge W) & (A\wedge Y)\vee(B\wedge Z)\\(C\wedge X)\vee(D\wedge W) & (C\wedge Y)\vee(D\wedge Z)\end{bmatrix}$$

$$\begin{bmatrix}A & B\\C & D\end{bmatrix}\vee\begin{bmatrix}X & Y\\W & Z\end{bmatrix}=\begin{bmatrix}A\vee X & B\vee Y\\C\vee W & D\vee Z\end{bmatrix}$$

Here the standard definitions of A and V are used for individual (non-matrix) elements and for columns and row vectors the following is true:

$$[A \; B] \bigwedge \begin{bmatrix} X \\ Y \end{bmatrix} =$$

$$(A \wedge X) \bigvee (B \wedge Y) \begin{bmatrix} X \\ Y \end{bmatrix} \bigwedge [A \; B] = \begin{bmatrix} (X \wedge A) & (X \wedge B) \\ (Y \wedge A) & (Y \wedge B) \end{bmatrix}$$

This f(A,n) function can be viewed as a parallel distributed version of dynamic programming for the all-pairs reachability problem, where f(A,n) for adjacency matrix A and number of vertices n returns the reachability matrix.

The shortest path between all pairs of vertices in a graph is also an important matrix problem. Unfortunately, with current methods all-pairs shortest-path computations scale poorly with the size of the graph because they are quadratic in the number of vertices. For example, in graphs generated social networks such as Facebook (700 million vertices), LinkedIn (100 million) and Twitter (200 million), computing the shortest path distance between a single pair of vertices can take a minute or more using traditional algorithms such as breadth-first-search (BFS). Since there are on the order of 100 million squared such pairs, the time taken to compute them all using traditional methods in on the order of 100000 million minutes. Similarly, variants such as Dijkstra and Floyd-Warshall also fail to scale to these network sizes. Point-to-point path queries are ubiquitous in social network industry. For instance, in professional networks like LinkedIn, it is desirable to find a short path from a job seeker to a potential employer; in social networks like Orkut, Facebook and Twitter, it is desirable to find how users are connected to each other; in social auction sites, distance and paths can be used to identify more trustworthy sellers; academic networks (e.g. Microsoft academic search) compute paths between different authors; etc. More recently, these queries have also been used in the context of socially-sensitive and location-aware search, where it is required to compute distances (and paths) between a user and content of potential interest to the user. Many of these applications require (or can benefit from) computing shortest paths.

$$g(n) = \begin{cases} A & n = 1 \\ \min(A, z(A, g(n-1))) & n > 1 \end{cases}$$

Where A, B, C, D, X, Y, W, Z are conformably partitioned and:

$$z\left( \begin{bmatrix} A & B \\ C & D \end{bmatrix}, \begin{bmatrix} X & Y \\ W & Z \end{bmatrix} \right) = \begin{bmatrix} \min(z(A, X), z(B, W)) & \min(z(A, Y), z(B, Z)) \\ \min(z(C, X), z(D, W)) & \min(z(C, Y), z(D, Z)) \end{bmatrix}$$

$$z\left( [A \; B], \begin{bmatrix} X \\ Y \end{bmatrix} \right) = \min(z(A, X), z(B, Y))$$

$$\min\left( \begin{bmatrix} A & B \\ C & D \end{bmatrix}, \begin{bmatrix} X & Y \\ W & Z \end{bmatrix} \right) = \begin{bmatrix} \min(A, X) & \min(B, Y) \\ \min(C, W) & \min(D, Z) \end{bmatrix}$$

And where z(X, Y)=X+Y when X and Y are individual (non-matrix) elements (i.e., the recursion for the z function bottoms out with this terminal case). The g and z functions can be deployed using embodiments of the present invention for fast parallel distributed shortest-path computations.

Other Matrix Operations Using Embodiments of the Present Invention

Other parallel operations are possible including matrix division, determinants, addition, subtraction, multiplication, matrix traces, matrix transposes, and standard database operations such as index-based retrieval and proximity-based retrieval (i.e., nearest neighbor, where a nearness or distance measure can be defined by the user).

Other parallel distributed operations can include credit card processing involving fraud detection; data mining and linear regression, which often involves matrix inversions; investment analysis; digital image processing (e.g., finding patterns for oil, gas, mineral exploration, intelligence gathering, and space applications); fingerprint and facial recognition matching (e.g., finding a fingerprint or a face in billions of records); numerical data analysis from super-colliders (i.e, which involves petabytes of annual data), sensor data processing, market simulation (e.g., portfolio pricing, risk hedge calculation, market and credit evaluation, counter-party netting, margin calculation, cash flow analysis, and demographic analysis, interest rate swap modeling), and statistical inference in sequence analysis. Other functions can include branch-and-bound processes over database index access utilizing a tree-structure, collision detection of particles and objects using branch-and-bound, and machine learning clustering and prediction methods.

Embodiments of the present invention can also be used to facilitate the following selection operations over a matrix: selecting rows or columns based on ranges, lists of indices, particular elements, rows only, columns only. For these selection operations, embodiments of the present invention can be used to compute inverses (including the Moore-Penrose pseudo-inverse), addition, subtraction, multiplication, division, unary—, determinants, counts, histograms by buckets, summary statistics such as min, max, argmin, argmax, variance, covariance, quantiles, medians, kurtosis, cumulative sums, sum of products, percent changes, transpositions, proximity search, top/bottom k values, top/bottom k % values. In addition, standard masks can be used to select particular cells in the matrix on which these operations can take place—all using the parallel distributed method and apparatus in embodiments of the present invention.

Caching

Embodiments of the present invention can also cache responses to a request, thus improving the speed of a response for similar requests. For example, matrix inversions can involve providing a solution to common sub-expressions, whose solution can be cached. The cache can be maintained by deleting the least frequently used or the least important cache items or with any other caching method currently used or to be invented in the future.

Fault Tolerance

Embodiments of the present invention can improve fault tolerance by offering multiple ways to send a request for a service. For example, if one node is down, another node can be used. Moreover, even if all nodes are down, a cached response might be available at the node, thus improving fault tolerance through caching.

Networks

Embodiments of the present invention can use an existing network such as the Internet without modification of the underlying routing architecture. More specifically, embodiments of the present invention can be layer on top of the Internet. That is, no new storage structures are required to facilitate processing of a request in a network, in accordance with embodiments of the present invention.

Embodiments of the present invention offer end-to-end security through several methods: homomorphic or other encryption/decryption between each pair of neighbor nodes, authorization between each pair of neighbor nodes, authentication between each pair of neighbor nodes, and certification between each pair of neighbor nodes. These embodiments can eliminate the possibility of spam attacks as well as the injection of unauthorized requests into the network (e.g., denial of service attacks).

Typical distributed computing requires an expensive infrastructure. Embodiments of the present invention eliminate his expense by enabling the network itself to act as the infrastructure. These embodiments let any user offer their services, whose speed arises from decomposition of an initial request into smaller requests, which can be fulfilled in parallel, then composed and returned as a response. In other words, a user providing a service does not require a fast computer; the user merely needs to leverage the parallel distributed nature of the network through in accordance with embodiments of the present invention.

A network can be a set of nodes where each node is coupled to a set of other nodes in the network (i.e., neighbors of the node). The coupling can be a wired or wireless connection and a node can be a device (e.g., a router), a computer, or a user. A network can also represent subnetworks or super-networks which can couple one node to another node. A neighbor of a node (i.e., a first neighbor or second neighbor) is a node in the network which is locally coupled to the node (i.e. a single "hop"). Receiving and sending at a node can be accomplished through network interfaces (i.e., ports) associated with the node.

Each port can be coupled to neighbor nodes and can have an input (incoming or receiving) side and an output (outgoing or sending) side. Embodiments of the present invention (i.e. the system) can reside on and execute at any node in the network.

DETAILED DESCRIPTION OF THE FIGURES

FIG. 1 illustrates the network context of for facilitating parallel distributed computing in accordance with an embodiment of the present invention. The requesting node (not actually part of the system) sends a request across network 110, which receiving node 120 receives via network 110. Network 110 can be a wired or wireless communication network. Receiving node 120 can be a centralized computing system or a distributed computing system linked by other communication networks (not shown). Receiving node 120 can also be a mobile server on which mobile requests can be received. Alternatively, the mobile server can be separate from receiving node 120. Note that, in such embodiments, the mobile server and server 120 would typically be able to communicate with one another via a network.

Receiving node 120 is also connected to other nodes 160, 170, . . . , and 180. (The ellipses represent multiple such other nodes). These other nodes are connected to receiving node 120 via network 130, network 140, . . . network 150. (The ellipses represent multiple such networks). The networks can be the same or different.

The other nodes capture the relationship between the receiving node and nodes $a_1, \ldots a_k$ and nodes $f_1, \ldots, f_n$. These two sets of nodes are not necessarily the same—the illustration is merely to show the connection to the receiving node and that some network connects both sets of nodes to the receiving node.

Figure 2:
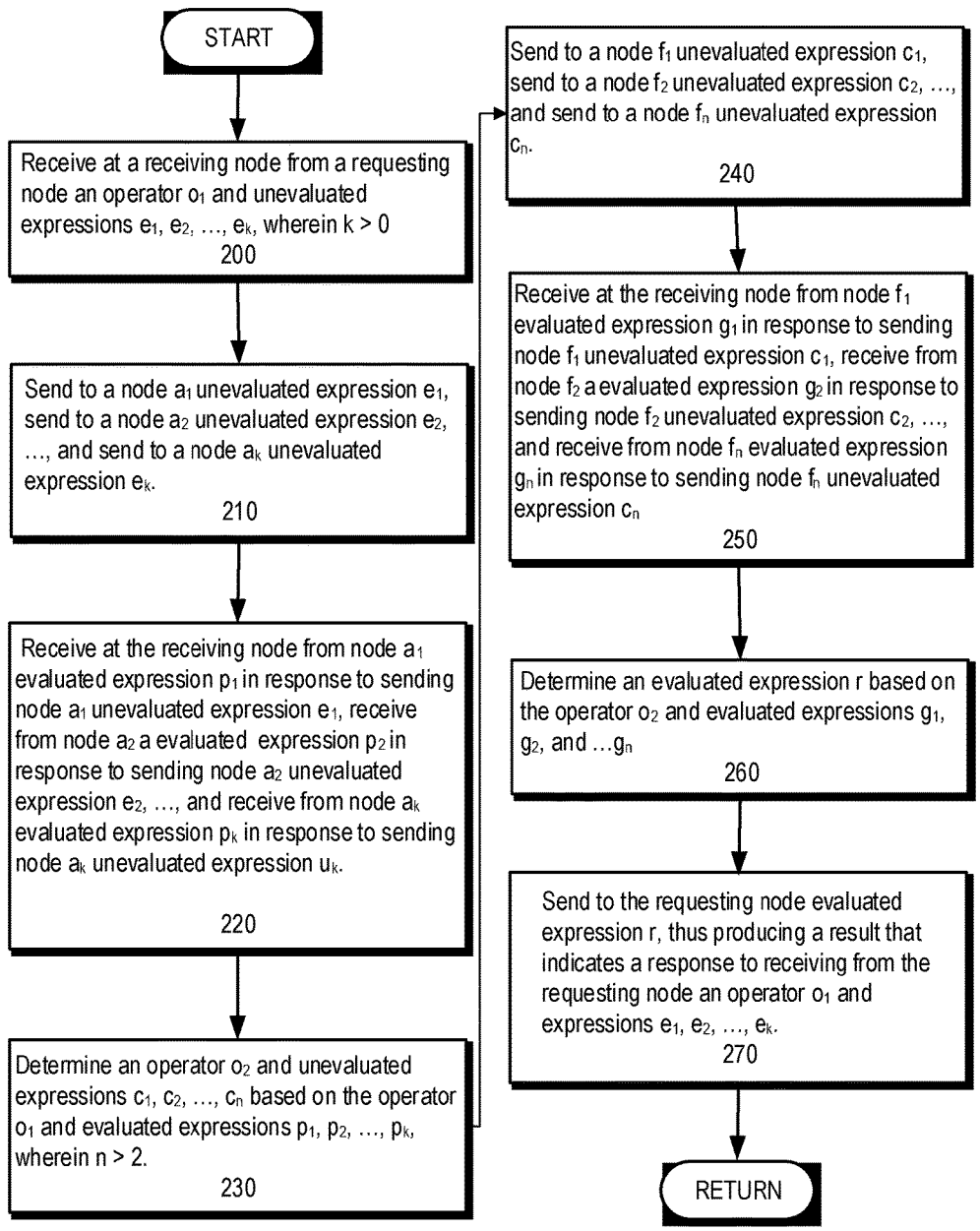
FIG. 2 presents a flow chart illustrating a process for facilitating parallel distributed computing in accordance with an embodiment of the present invention.

FIG. 2 presents a flow chart illustrating a process for facilitating parallel distributed computing. Process 200 receives from a requesting node an operator $o_1$ and unevaluated expressions $e_1, e_2, \ldots, e_k$, wherein k>0. Process 210 sends to a node $a_1$ unevaluated expression $e_1$, sends to a node $a_2$ unevaluated expression $e_2, \ldots$, and sends to a node $a_k$ unevaluated expression $u_k$. Note that the steps in process 210 can be run in parallel. Process 220 receives from node $a_1$ evaluated expression $p_1$ in response to sending node $a_1$ unevaluated expression $e_1$, receives from node $a_2$ evaluated expression $p_2$ in response to sending node $a_2$ unevaluated expression $e_2, \ldots$, and receives from node $a_k$ evaluated expression $p_k$ in response to sending node $a_k$ unevaluated expression $u_k$. Note that the steps in process 220 can be run in parallel. Process 230 determines an operator $o_2$ and unevaluated expressions $c_1, c_2, \ldots, c_n$ based on the operator $o_1$ and evaluated expressions $p_1, p_2, \ldots, p_k$, wherein n>2.

Process 240 sends to a node $f_1$ unevaluated expression $c_1$, sends to a node $f_2$ unevaluated expression $c_2, \ldots$, and sends to a node $f_k$ unevaluated expression $c_k$.

Process 250 receives from node $f_1$ evaluated expression $g_1$ in response to sending node $f_1$ unevaluated expression $c_1$, receives from node $f_2$ evaluated expression $g_2$ in response to sending node $f_2$ unevaluated expression $c_2, \ldots$, and receives from node $f_k$ evaluated expression $g_k$ in response to sending node $f_k$ unevaluated expression $c_k$. Note that the steps in process 250 can be run in parallel.

Process 260 determines an evaluated expression r based on the operator $o_2$ and evaluated expressions $g_1, g_2$, and . . . $g_n$. Process 270 sends to the requesting node evaluated expression r, thus producing a result that indicates a response to receiving from the requesting node an operator $o_1$ and unevaluated expression $e_1, e_2, \ldots, e_k$.

Figure 3:
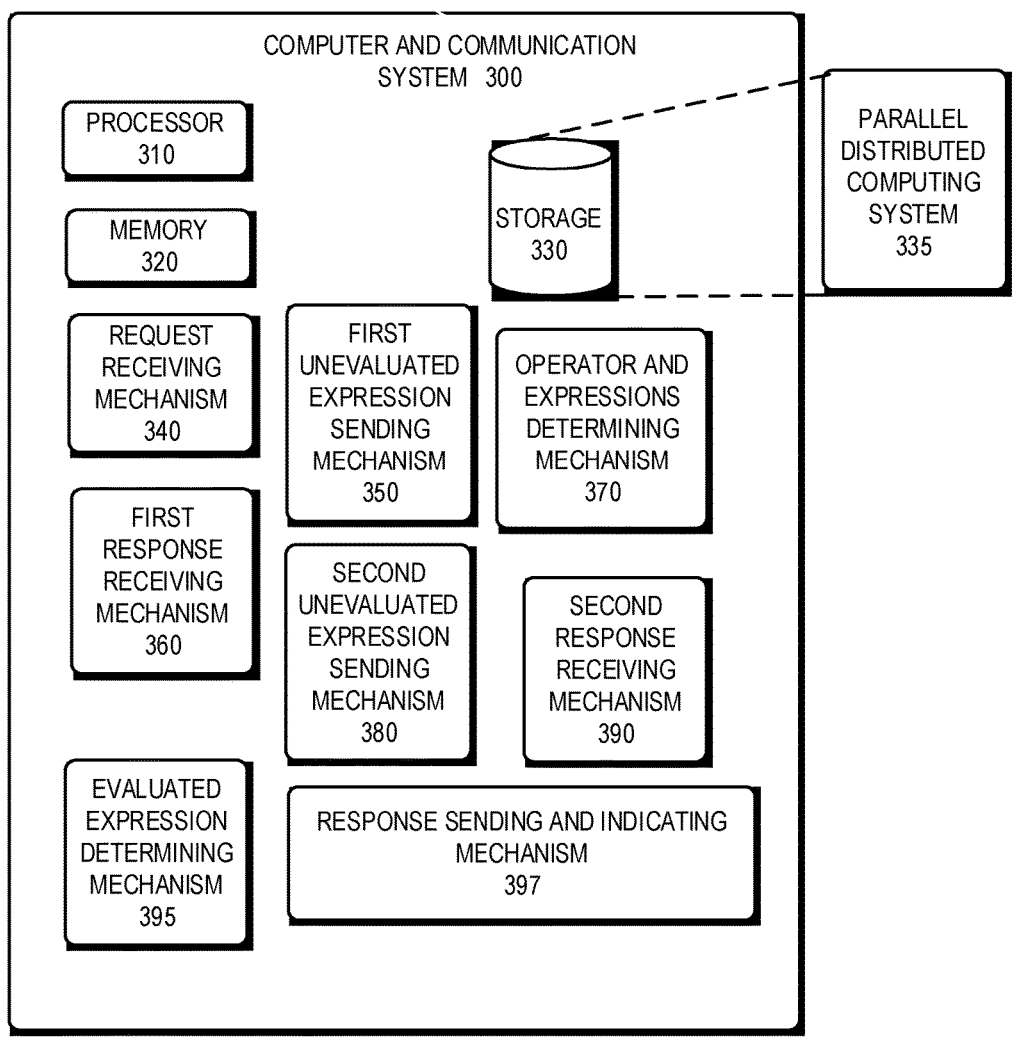
FIG. 3 is an exemplary system for facilitating parallel distributed computing in accordance with an embodiment of the present invention.

FIG. 3 is an exemplary system for facilitating parallel distributed computing in accordance with an embodiment of the present invention. Computer and communication system 300 comprises processor 310, memory 320, storage 330, request receiving mechanism 340, first unevaluated expression sending mechanism 350, and first response receiving mechanism 360, operator and expressions determining mechanism 370, second unevaluated expression sending mechanism 380, second response receiving mechanism 390, evaluated expression determining mechanism 395, and response sending and indicating mechanism 397, all of which can be in communication with each other through various means.

For example, processor 310 can communicate through a bus system to memory 320, storage 330, and all of the other mechanisms shown FIG. 3. Processor 310 can also communicate through direct couplings to memory 320, storage 330, and all of the other mechanisms shown in FIG. 3. Processor 310 can also communicate through a local or wide area network (e.g., the Internet) to memory 320, storage 330, and all of the other mechanisms shown in FIG. 3. Thus, processor 310, memory 320, storage 330, and all of the other mechanisms shown in FIG. 3. can be on a single chip, in close proximity, or widely distributed in geography.

In some embodiments, the mechanisms shown in FIG. 3. can be part of processor 310. Further, in some embodiments, the system may not include a separate processor and memory. Instead, in addition to performing their specific tasks, the mechanisms shown in FIG. 3 may function as general purpose computation engines.

Storage 330 stores programs to be executed by processor 310. Specifically, storage 330 stores a program that implements a system (335) for facilitating parallel distributed computing. During operation, the program can be loaded from storage 330 into memory 320 and executed by processor 310. As a result, computer and communication system 300 can perform the functions described above.

In an embodiment, request receiving mechanism receives from a requesting node an operator $o_1$ and unevaluated expressions $e_1, e_2, \ldots, e_k$, wherein k>0. Upon or before this receipt, processor 310 activates mechanism 340. Next, processor 310 activates mechanism 350, which sends to a node $a_1$ unevaluated expression $e_1$, sends to a node $a_2$ unevaluated expression $e_2$, ..., and sends to a node $a_k$ unevaluated expression $u_k$.

Subsequently, processor waits for a return response and then activates mechanism 360, which receives from node $a_1$ evaluated expression pt in response to sending node $a_1$ unevaluated expression $e_1$, receives from node $a_2$ evaluated expression $p_2$ in response to sending node $a_2$ unevaluated expression $e_2$, ..., and receives from node $a_k$ evaluated expression $p_k$ in response to sending node $a_k$ unevaluated expression $u_k$.

Next, processor 310 activates mechanism 370, which determines an operator $o_2$ and unevaluated expressions $c_1$, $c_2$, ..., $c_n$ based on the operator $o_1$ and evaluated expressions $p_1$, $p_2$, ..., $p_k$, wherein n>2. Subsequently, processor 310 activates mechanism 380, which sends to a node $t_1$ unevaluated expression $c_1$, sends to a node $f_2$ unevaluated expression $c_2$, ..., and sends to a node $f_k$ unevaluated expression $c_k$.

Upon receipt of a response, processor 310 activates mechanism 390, which receives from node $f_1$ evaluated expression $g_1$ in response to sending node $f_1$ unevaluated expression $c_1$, receives from node $f_2$ evaluated expression $g_2$ in response to sending node $f_2$ unevaluated expression $c_2$, ..., and receives from node $f_k$ evaluated expression $g_k$ in response to sending node $f_k$ unevaluated expression $c_k$. Note that all of the receipts can be operating in parallel on separate mechanisms as can all of the other sending and receiving mechanisms described above.

Next, processor 310 activates mechanism 395, which determines an evaluated expression r based on the operator $o_2$ and evaluated expressions $g_1$, $g_2$, and ... $g_n$. Subsequently, process 310 activates mechanism 397, which sends to the requesting node evaluated expression r, thus producing a result that indicates a response to receiving from the requesting node an operator $o_1$ and unevaluated expressions $e_1$, $e_2$, ..., $e_k$.

In the various embodiments of computer and communication system 300, each of the mechanisms outlined above can be implemented as portions of a suitably programmed general-purpose computer. Alternatively, the mechanisms can be implemented as physically distinct hardware circuits within an ASIC, or using a FPGA, a PDL, a PLA or a PAL, or using discrete logic elements or discrete circuit elements. It will be evident to practitioners skilled in the art that the particular form each of the mechanisms outlined above can depend on one or more design choices.

Moreover, computer and communication system 300 and/or each of the various mechanisms discussed above can be implemented as software routines, managers or objects executing on a programmed general purpose computer, a special purpose computer, a microprocessor or the like. In this case, computer and communication system 300 and/or each of the various mechanisms discussed above can be implemented as one or more routines embedded in the communications network, as a resource residing on a server, or the like. Computer and communication system 300 and the various mechanisms discussed above can also be implemented by physically incorporating computer and communication system 300 into a software and/or hardware system, such as the hardware and software systems of a web server or a client device.

As shown in FIG. 3, memory 320 can be implemented using any appropriate combination of alterable, volatile or non-volatile memory, or non-alterable or fixed memory. The alterable memory, whether volatile or non-volatile, can be implemented using any one or more of static or dynamic RAM, a floppy disk and disk drive, a (ie) writable optical disk and disk drive, a hard drive, flash memory, or the like. Similarly, the non-alterable or fixed memory can be implemented using any one or more of ROM, PROM, EPROM, EEPROM, an optical ROM disk, such as a CD-ROM or DVD-ROM disk, or the like.

Similarly, the communication links shown in FIG. 1. can each be any known or later developed device or system for connecting a communication device to computer and communication system 300, including a direct cable connection, a connection over a wide area network or a local area network, a connection over an intranet, a connection over the Internet, or a connection over any other distributed processing network or system. In general, these communication links can be any known or later developed connection system or structure usable to connect devices and facilitate communication.

Further, the communication links can be wired or wireless links to a network. The network can be a local area network, a wide area network, an intranet, the Internet, or any other distributed processing and storage network.

Afterword

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating parallel distributed computing, comprising:
  receiving at a receiving node from a requesting node an operator $o_1$ and unevaluated expressions $e_1, e_2, \ldots, e_k$, wherein k>0, and
  wherein the requesting node is desiring a response to the request comprising an evaluated expression which corresponds to the result of applying the operator $o_1$ to the unevaluated expressions $e_1, e_2, \ldots, e_k$;

sending to a node $a_1$ unevaluated expression $e_1$, sending to a node $a_2$ unevaluated expression $e_2$, ..., and sending to a node $a_k$ unevaluated expression $e_k$;

receiving at the receiving node from node $a_1$ evaluated expression $p_1$ in response to sending node $a_1$ unevaluated expression $e_1$, receiving from node $a_2$ a evaluated expression $p_2$ in response to sending node $a_2$ unevaluated expression $e_2$, ..., and receiving from node $a_k$ evaluated expression $p_k$ in response to sending node $a_k$ unevaluated expression $u_k$;

determining an operator $o_2$ and unevaluated expressions $c_1, c_2, \ldots, c_n$ based on the operator $o_1$ and evaluated expressions $p_1, p_2, \ldots, p_k$, wherein n>2;

sending to a node $f_1$ unevaluated expression $c_1$, sending to a node $f_2$ unevaluated expression $c_2$, ..., and sending to a node $f_n$ unevaluated expression $c_n$;

receiving at the receiving node from node $f_1$ evaluated expression $g_1$ in response to sending node $f_1$ unevaluated expression $c_1$, receiving from node $f_2$ a evaluated expression $g_2$ in response to sending node $f_2$ unevaluated expression $c_2$, ..., and receiving from node $f_n$ evaluated expression $g_n$ in response to sending node $f_n$ unevaluated expression $c_n$;

determining an evaluated expression r based on the operator $o_2$ and evaluated expressions $g_1, g_2$, and ... $g_n$; and sending to the requesting node evaluated expression r, thus producing a result that indicates a response to receiving from the requesting node an operator $o_1$ and expressions $e_1, e_2, \ldots, e_k$.

2. The method of claim 1, wherein the operator $o_1$ involves matrix operations and the expressions $e_1, e_2, \ldots, e_k$ correspond to matrices.

3. The method of claim 2, wherein the operator $o_1$ can be any of matrix inversion, matrix multiplication, matrix addition, matrix subtraction, matrix division, matrix determinant, matrix (graph) reachability, and matrix (graph) shortest path.

4. The method of claim 1, wherein the nodes are determined by sending a request to a server, which responds with a list of nodes.

5. The method of claim 4, wherein the list of nodes is based on historical response time of each of the nodes.

6. A computer-readable storage medium storing instructions that when executed by a computer cause the computer to perform a method for facilitating parallel distributed computing, the method comprising:

receiving at a receiving node from a requesting node an operator $o_1$ and unevaluated expressions $e_1, e_2, \ldots, e_k$, wherein k>0, and wherein the requesting node is desiring a response to the request comprising an evaluated expression which corresponds to the result of applying the operator or to the unevaluated expressions $e_1, e_2, \ldots, e_k$;

sending to a node $a_1$ unevaluated expression $e_1$, sending to a node $a_2$ unevaluated expression $e_2$, ..., and sending to a node $a_k$ unevaluated expression $e_k$;

receiving at the receiving node from node $a_1$ evaluated expression $p_1$ in response to sending node $a_1$ unevaluated expression $e_1$, receiving from node $a_2$ a evaluated expression $p_2$ in response to sending node $a_2$ unevaluated expression $e_2$, ..., and receiving from node $a_k$ evaluated expression $p_k$ in response to sending node $a_k$ unevaluated expression $u_k$;

determining an operator $o_2$ and unevaluated expressions $c_1, c_2, \ldots, c_n$ based on the operator $o_1$ and evaluated expressions $p_1, p_2, \ldots, p_k$, wherein n>2;

sending to a node $f_1$ unevaluated expression $c_1$, sending to a node $f_2$ unevaluated expression $c_2$, ..., and sending to a node $f_n$ unevaluated expression $c_n$;

receiving at the receiving node from node $f_1$ evaluated expression $g_1$ in response to sending node $f_1$ unevaluated expression $c_1$, receiving from node $f_2$ a evaluated expression $g_2$ in response to sending node $f_2$ unevaluated expression $c_2$, ..., and receiving from node $f_n$ evaluated expression $g_n$ in response to sending node $f_n$ unevaluated expression $c_n$;

determining an evaluated expression r based on the operator $o_2$ and evaluated expressions $g_1, g_2$, and ... $g_n$; and sending to the requesting node evaluated expression r, thus producing a result that indicates a response to receiving from the requesting node an operator $o_1$ and expressions $e_1, e_2, \ldots, e_k$.

7. The computer-readable storage medium of claim 6, wherein the operator $o_1$ involves matrix operations and the expressions $e_1, e_2, \ldots, e_k$ correspond to matrices.

8. The computer-readable storage medium of claim 7, wherein the operator $o_1$ can be any of matrix inversion, matrix multiplication, matrix addition, matrix subtraction, matrix division, matrix determinant, matrix (graph) reachability, and matrix (graph) shortest path.

9. The computer-readable storage medium of claim 6, wherein the nodes are determined by sending a request to a server, which responds with a list of nodes.

10. The computer-readable storage medium of claim 9, wherein the list of nodes is based on historical response time of each of the nodes.

11. An apparatus for facilitating parallel distributed computing, comprising:

a receiving node, which comprises a processor and memory, and which services requests for expression evaluation;

wherein the receiving node is configured to:

receive from a requesting node an operator $o_1$ and unevaluated expressions $e_1, e_2, \ldots, e_k$, wherein k>0, and wherein the requesting node is desiring a response to the request comprising an evaluated expression which corresponds to the result of applying the operator $o_1$ to the unevaluated expressions $e_1, e_2, \ldots, e_k$;

send to a node $a_1$ unevaluated expression $e_1$, send to a node $a_2$ unevaluated expression $e_2$, ..., and send to a node $a_k$ unevaluated expression $e_k$;

receive from node $a_1$ evaluated expression $p_1$ in response to sending node at unevaluated expression $e_1$, receive from node $a_2$ a evaluated expression $p_2$ in response to sending node $a_2$ unevaluated expression $e_2$, ..., and receive from node $a_k$ evaluated expression $p_k$ in response to sending node $a_k$ unevaluated expression $u_k$;

determine an operator $o_2$ and unevaluated expressions $c_1, c_2, \ldots, c_n$ based on the operator $o_1$ and evaluated expressions $p_1, p_2, \ldots, p_k$, wherein n>2 send to a node $f_1$ unevaluated expression $c_1$, sending to a node $f_2$ unevaluated expression $c_2$, ..., and send to a node $f_n$ unevaluated expression $c_n$;

receive from node $f_1$ evaluated expression $g_1$ in response to sending node $f_1$ unevaluated expression $c_1$, receive from node $f_2$ a evaluated expression $g_2$ in response to sending node $f_2$ unevaluated expression $c_2$, ..., and receive from node $f_n$ evaluated expression $g_n$ in response to sending node $f_n$ unevaluated expression $c_n$;

determine an evaluated expression r based on the operator $o_2$ and evaluated expressions $g_1, g_2$, and ... $g_n$; and send to the requesting node evaluated expression r, thus producing a result that indicates a response to receiving from the requesting node an operator $o_1$ and expressions $e_1, e_2, \ldots, e_k$.

12. The apparatus of claim 11, wherein the operator $o_1$ involves matrix operations and the expressions $e_1, e_2, \ldots, e_k$ correspond to matrices.

13. The apparatus of claim 12, wherein the operator $o_1$ can be any of matrix inversion, matrix multiplication, matrix addition, matrix subtraction, matrix division, matrix determinant, matrix (graph) reachability, and matrix (graph) shortest path.

14. The apparatus of claim 11, wherein the nodes are determined by sending a request to a server, which responds with a list of nodes.

15. The apparatus of claim 14, wherein the list of nodes is based on historical response time of each of the nodes.

* * * * *